United States Patent [19]

Santilli

[11] 3,930,310

[45] Jan. 6, 1976

[54] STABLE POWER RING TOOL

[76] Inventor: Ermanno Santilli, Via Virgilio Ramperti 19, Rome, Italy

[22] Filed: Feb. 27, 1974

[21] Appl. No.: 446,499

Related U.S. Application Data

[63] Continuation of Ser. No. 166,783, July 28, 1971, abandoned.

[30] Foreign Application Priority Data

Dec. 11, 1970 Italy.................................. 55319/70

[52] U.S. Cl. ................................................ 30/389
[51] Int. Cl.$^2$ ......................................... B27B 5/14
[58] Field of Search ...................................... 30/389

[56] References Cited
UNITED STATES PATENTS

| | | | |
|---|---|---|---|
| 3,221,783 | 12/1965 | Kaltinmark et al................... | 30/389 |
| 3,438,410 | 4/1969 | Santilli.................................. | 30/389 |

FOREIGN PATENTS OR APPLICATIONS

| | | | |
|---|---|---|---|
| 231,147 | 1/1964 | Austria ............................... | 30/389 |
| 1,358,457 | 3/1964 | France ............................... | 30/389 |

*Primary Examiner*—Donald R. Schran
*Attorney, Agent, or Firm*—Abraham Ogman, Esq.

[57] ABSTRACT

A portable power tool having an annular ring tool, such as a saw blade or grinding wheel, driven on its periphery by a power unit. A ring tool housing carries the ring tool and is mounted to the power unit, the latter having a drive shaft roller which frictionally engages one surface of the ring tool. Ring tool guide bearings and ring tool support bearings oppose and cooperate with the drive roller to retain the ring tool within the housing during its rotation.

The driven shaft axis is canted at an angle extending beyond the center of the ring tool or toward the working side of the ring tool to counteract the torque forces produced by the working operation. Means are also provided to vary the drive roller pressure on the ring tool to balance the torque or, alternatively, to vary the drive shaft axis angle to balance the torque thereby producing dynamic stability during the working operation regardless of work piece resistance.

12 Claims, 34 Drawing Figures

INVENTOR
ERMANNO SANTILLI
BY
ATTORNEY

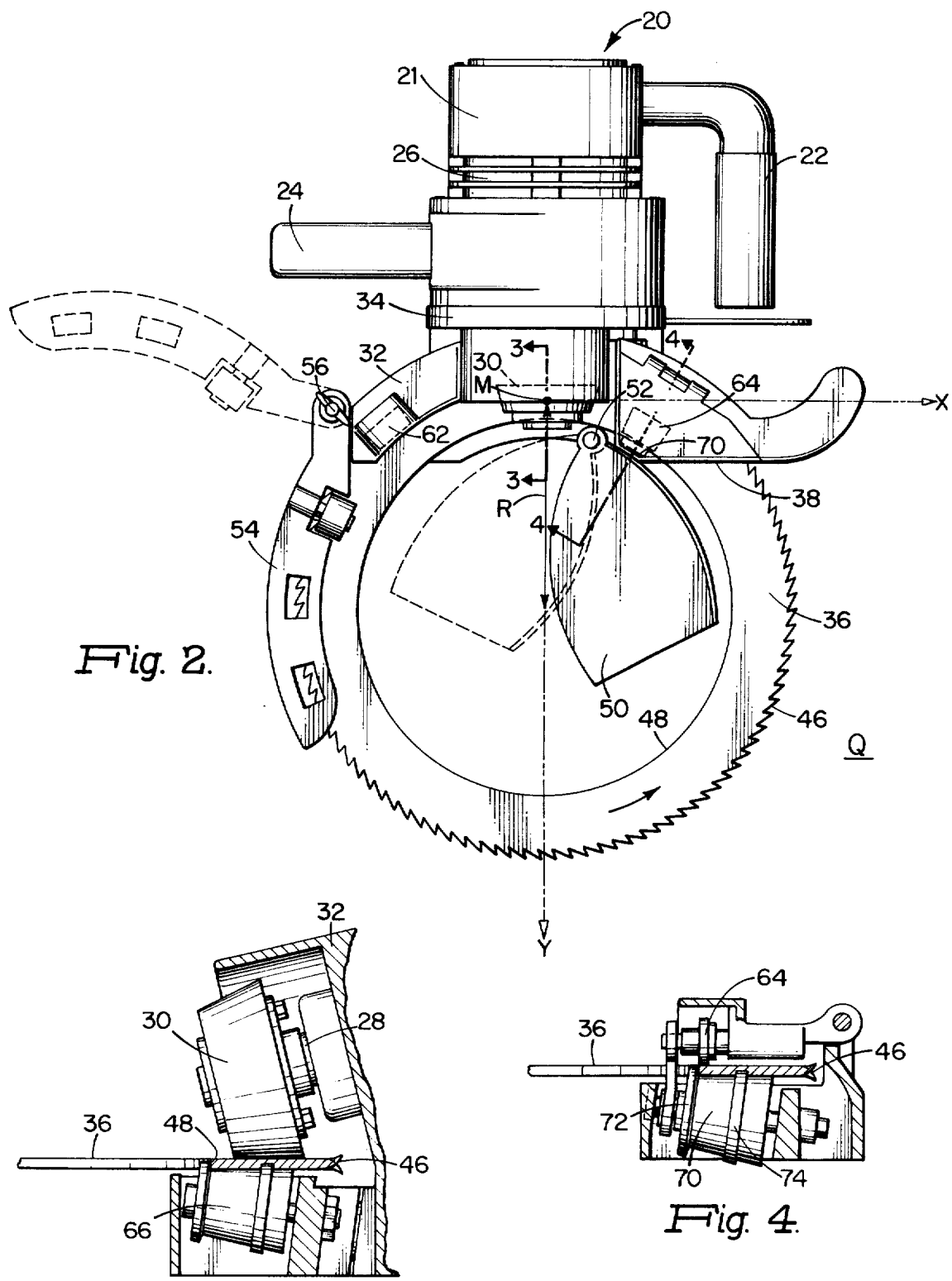

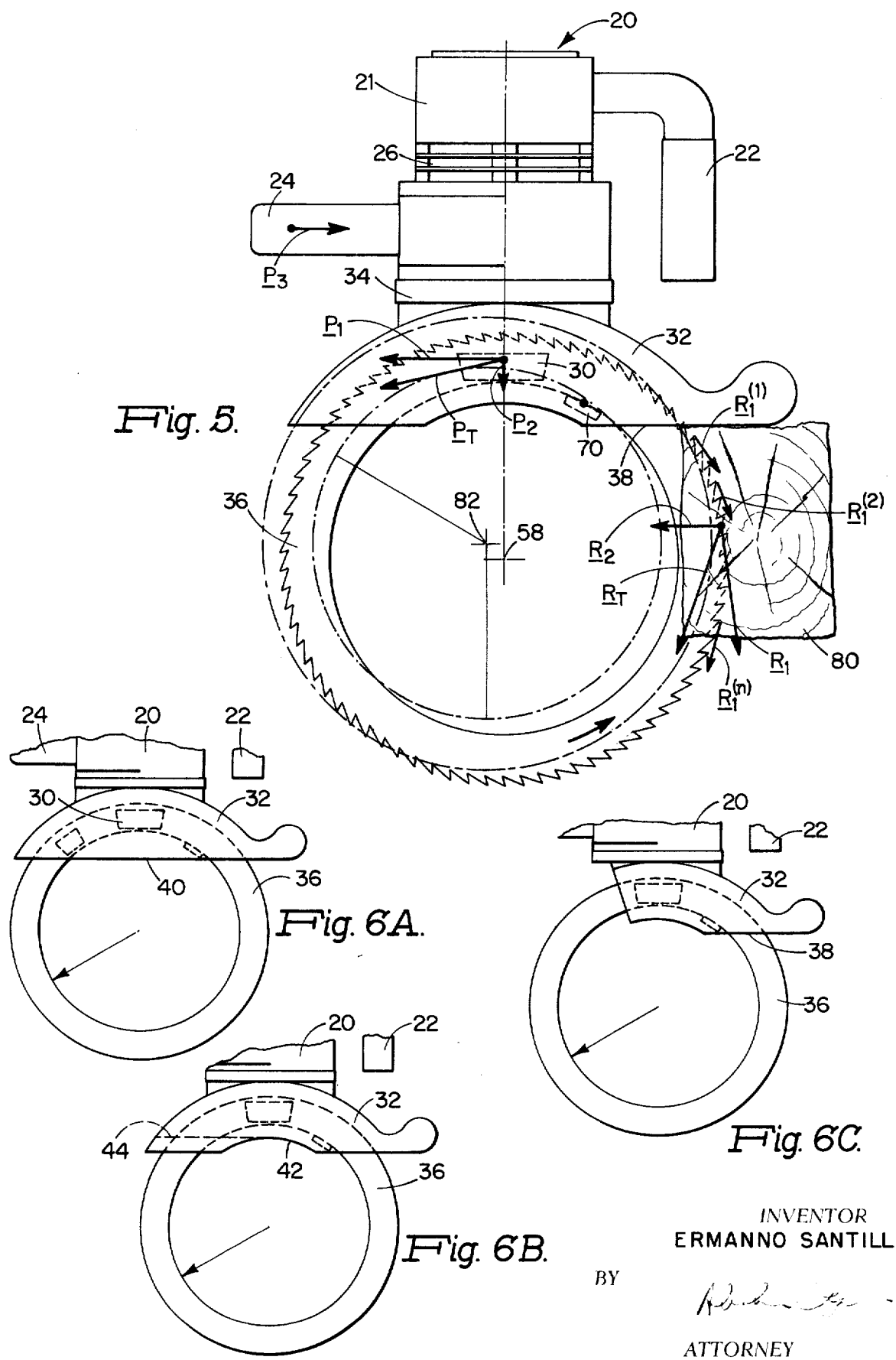

INVENTOR
ERMANNO SANTILLI

ATTORNEY

INVENTOR
ERMANNO SANTILLI

BY

ATTORNEY

INVENTOR
ERMANNO SANTILLI

BY

ATTORNEY

STABLE POWER RING TOOL

This application is a continuation of application Ser. No. 166,783, filed July 28, 1971, now abandoned.

BACKGROUND OF THE INVENTION

U.S. Pat. Nos. 2,972,363 and 3,438,410 disclose annular ring saws which employ apertured circular blades. These portable power saws permit a depth of cut greater than the radius of the blade.

The ring blades shown in these two patents are each peripherally driven by a power roller. Each blade has grooves formed in its upper and/or lower blade surfaces to accommodate blade guide rollers which maintain the blade virtual axial displacement as it is rotationally driven about its virtuall axis. Blade support rollers also act similarly on the blade's inner periphery to prevent radial displacement.

When a tree or other workpiece is being cut by the power saw, the high speed blade encounters considerable resistance from the workpiece. These reaction forces act to shift the virtual axis of the ring blade in a direction opposite to that of blade rotation. In the two previously mentioned patents, these reaction forces are primarily opposed by the operator himself, resulting in fatigue, and by the blade guide and blade support rollers.

However, experience has shown that, due to the blade's high speed, the reaction forces tend to quickly heat and wear the grooves in the blade and to heat and wear the guide and support rollers themselves. This wearing action produces undesired blade vibration and poor cutting action. The solution of strengthening the blade, its grooves and the rollers is unsatisfactory for commercial reasons. Portable power saws of the ring type must be extremely light in order to compete with currently marketed saws, such as chain saws or circular saws which weigh as little as 6½ lbs. Therefore, adding more weight and/or substituting more expensive heat dissipating materials is an unsatisfactory solution to the problem of dynamic operational instability and rapid blade groove and roller wear.

It is an object of this invention to provide means for dynamically stabilizing the power tool so that the aforementioned wear problems are eliminated or at least greatly reduced.

Another object is to provide dynamic stabilizing means which permits a reduction of the weight, power requirement and manufacturing cost of the power tool and especially which permits the use of a very thin saw blade, grinding wheel or other ring tool.

A further object is to provide a power tool which has many advanced features such as means for rapidly inserting and withdrawing the ring tool from its housing, means for self-lubricating the ring tool and the rollers, means for preventing the build-up of waste on the power tool's moving parts, and safety means causing the drive roller to slip on the ring tool when excessive load occurs.

SUMMARY OF THE INVENTION

This invention includes significant improvements on and advantages over the ring saws shown and described in U.S. Pat. Nos. 2,972,363 and 3,438,410. Certain similarities do appear, however, and reference is hereby made to those patents to eliminate the need to repeat herein the disclosures of those patents.

This invention covers a power tool which utilizes a peripherally driven annular ring tool. The ring tool may take the form of a saw blade, a grinding wheel or any other annulus which has working means on its inner or outer edges or on its upper or lower flat surfaces. For convenience, the description herein shall refer to the saw blade embodiment, but it will be understood that no limitation is intended thereby.

The chief inventive feature of this invention is the provision of means to produce stability of the ring blade during the cutting operation. The invention takes several forms all of which act on the ring blade to counteract the torque effect caused by the resistance reaction forces generated at the blade-workpiece interface. In one form of the invention the drive roller axis is canted toward the cutting side of the blade center so that the drive roller produces a force on the saw blade having a tangential component for rotating the saw blade and a radial component tending to counteract the torque effect or the workpiece resistance.

Another form of the invention provides dynamic stabilization to balance the constantly fluctuating workpiece resistance forces. The dynamic stabilizing feature produces continuous variation of the drive roller pressure on the blade or produces continuous variation of the drive shaft axis angle relative to the drive shaft radial angle. Either mode of operation varies the radial force vector applied by the drive roller to the blade to balance the workpiece resistance torque forces.

A third stabilizing feature of the invention operates to produce stability of the drive axis is directed radially toward the center of the blade. A cam drive unit couples the drive roller to the motor so that the drive roller reciprocates along the drive axis in response to flucuations in workpiece resistance torque forces. As the drive roller moves up and down the drive axis it produces a radial force on the saw blade.

Finally, where the drive axis is radially directed, it may be angled, relative to saw blade plane, so that it intercepts the plane beyond the center of the blade. For a given force directed along the drive axis on the blade a larger inward radial force is produced.

Other new features of this invention include an improved blade housing, improved blade guide and blade support bearings, means for varying drive roller pressure on the blade, means for varying the drive shaft axis angle, means for inserting and withdrawing the blade from the blade housing, roller wiping means and roller lubricating means, and means for assembling the blade housing to the power unit.

BRIEF DESCRIPTION OF THE DRAWINGS

FIG. 2 is a top plan view of the saw of FIG. 1 showing the spacer plate and blade guard in their normal positions prior to cutting and (in phantom) pivoted to their extreme operating positions as would occur at the end of the cutting operation;

FIG. 3 is a view in section of the drive roller-opposing roller combination taken along line 3—3 of FIG. 2;

FIG. 4 is a view in section of the blade support roller combination taken along line 4—4 of FIG. 2;

FIG. 5 is a top plan view of the power saw of FIG. 2 showing the various force and resultant vectors which are applied to the ring blade during the cutting operation, and the position (in phantom) the blade is impelled toward by the workpiece reaction forces;

FIG. 6A is a schematic view showing a blade housing having an edge forming a chord across the blade periphery, said housing edge supporting workpiece travel during the cutting operation;

FIG. 6B is a schematic view of a modified blade housing similar to FIG. 6A except for a concave portion formed in the housing edge within the blade's central aperture;

FIG. 6C is schematic view of another modified blade housing similar to FIG. 6B except for the elimination of a portion of the housing on the trailing side thereof;

DESCRIPTION OF THE PREFERRED EMBODIMENT

Figure 1:
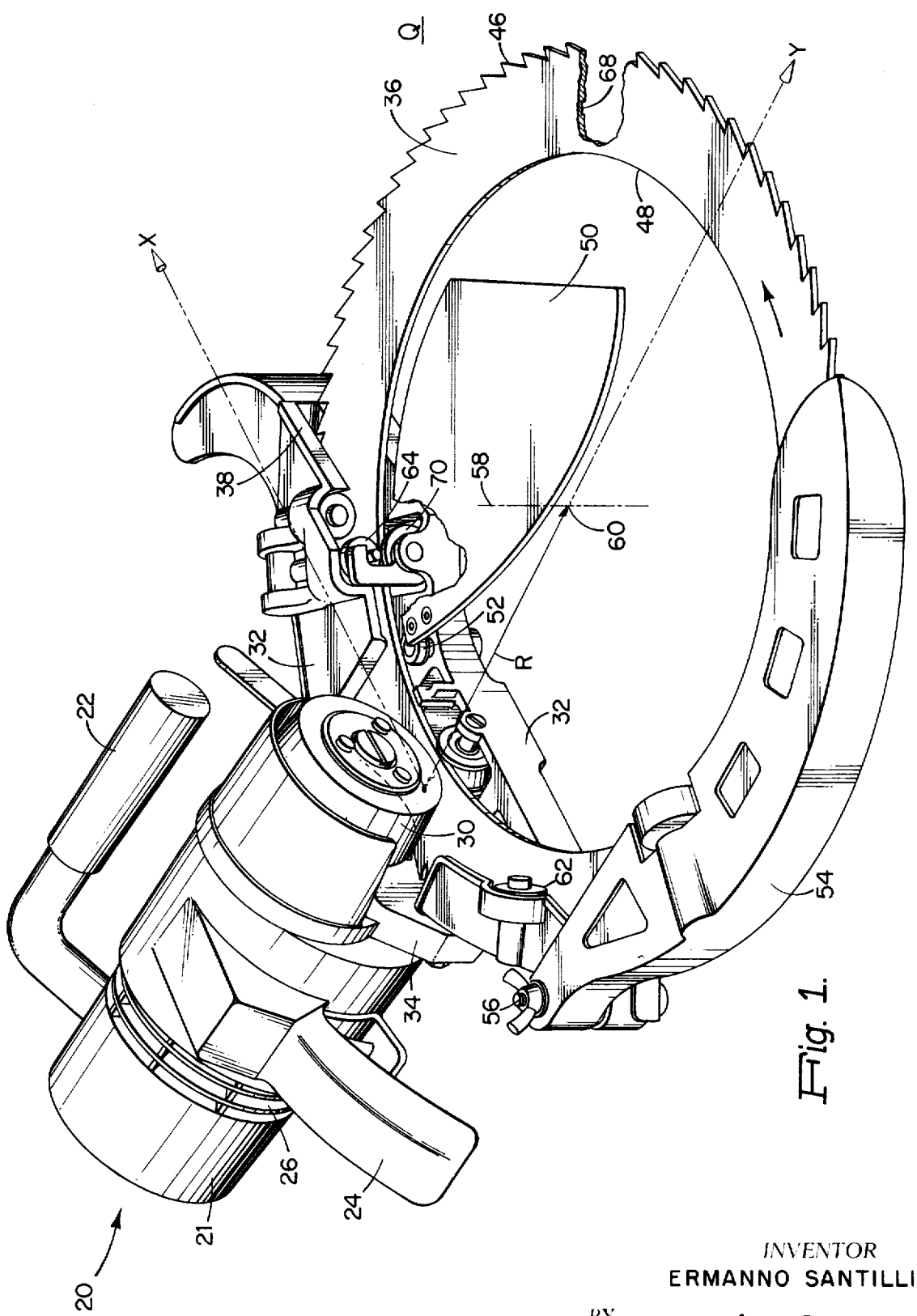
FIG. 1 is a perspective view of the portable power saw of this invention.

One preferred embodiment of the power saw of this invention is clearly shown in FIGS. 1 and 2. Many of the features are conventional and shall be only briefly described. It will be understood that although a power saw is herein described, it is intended that the invention applies equally to other power tools utilizing annular ring tools.

A power unit 20 includes a motor housing 21 which has a left handle 22 for the operator's lift hand and a right handle 24 for his right hand. A motor 26 is mounted within the motor housing 21 and may take the form of an electric motor, a gasoline engine, a pneumatic engine or the like. No matter which its form, the power unit 20 has a drive shaft 28 and a drive roller 30 mounted on the drive shaft.

A blade housing 32 is mounted on the power unit 20 by means of an intermediate mounting plate 34. Blade housing 32 is shaped to accommodate ring blade 36. The housing covers a minor portion of the periphery of blade 36 and is slotted to permit rotation of the blade within the housing interior. Blade housing 32 has a straight edge portion 38 which is adapted to support the workpiece as the cutting action proceeds. As can be seen in FIGS. 6A, 6B, and 6C, the straight edge portion 38 can form an entire chord 40 (FIG. 6A), can have a concavity 42 at its midpoint and be optionally set back on the trailing edge 44 (FIG. 6B) and can have the trailing portion eliminated entirely to save weight (FIG. 6C).

The ring blade 36 has teeth 46 on its outer periphery and a rim 48 on its inner periphery. It will be understood that the blade could have teeth extending normal to the plane of the blade, could have an abrasive crown or other means for working in either the axial or radial directions. The blade 36 is an annulus or ring with its center portion clear except for a spacer plate 50 which is pivoted on blade housing 32 by pivot pin 52. The function of spacer plate 50 is to prevent the leading portion of the workpiece cut from closing on itself before it encounters the non-cutting side of the ring blade. A safety guard 54 is pivoted on blade housing 32 by pivot pin 56 and swings clear as the workpiece passes the non-cutting side of the ring blade.

Drive roller 30 frictionally engages the upper surface of blade 36 as can be seen in FIG. 3. Drive roller 30 is conically shaped with the drive shaft axis pointing downward to intersect the ring blade plane. Rotation of drive roller 30 causes ring blade 36 to revolve in a counterclockwise direction about its virtual axis 58 which is an imaginary line running perpendicular to the ring blade plane through the center 60 of the blade. Obviously, a mirror image construction of the power saw of FIG. 1 would revolve the saw blade in a clockwise direction.

Two types of rollers or stationary bearings are provided in the blade housing to support the ring blade against axial and radial displacement during the cutting operation. These two functions can also be combined in the same roller. The blade guide rollers support the blade against axial displacement by rolling on planar blade surfaces. These blade planar surfaces comprise the flat of the blade. They do not include the bottoms of a groove which are constructed with clearance because of dust build-up problems. In FIGS. 1 and 2, blade guide rollers are upper rollers 62 and 64 and lower roller 66. Other guide rollers are employed but are not shown in the drawings. The upper guide rollers roll on the flat of blade 36. The lower rollers roll on the flat of the blade and in circular groove 68 as shown in FIGS. 1 and 3. The primary function of these rollers is to prevent axial displacement of the blade which occurs when the blade is twisted or when a force is applied at an angle to the plane of the blade.

Figure 7A:
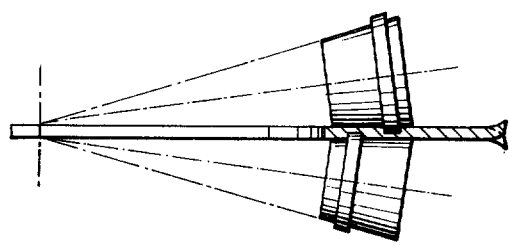
FIG. 7A is an elevational view of a pair of conical blade guide rollers with converging axes.
Figure 7B:
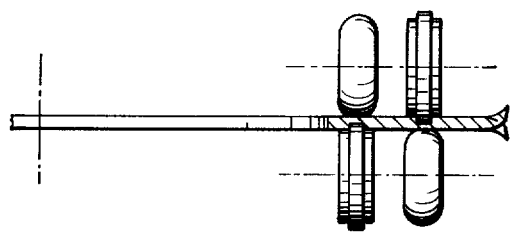
FIG. 7B is an elevational view of two pairs of blade guide rollers with substantially parallel radial axes.
Figure 7C:
FIG. 7C is an elevational view, in section, of a pair of block-type, self-lubricated blade guide bearings.

FIGS. 7A, 7B, and 7C show other alternative embodiments of the blade guide means utilizing both upper and lower grooves, various shaped rollers and, in FIG. 7C, an opposed pair of self-lubricating stationary bearings. It is important to understand that all guiding support is provided against the flat of the blade and that the function of the grooves in FIGS. 7A, 7B, and 7C is entirely to oppose radial movement of the blade outward away from the center.

Figure 8A:
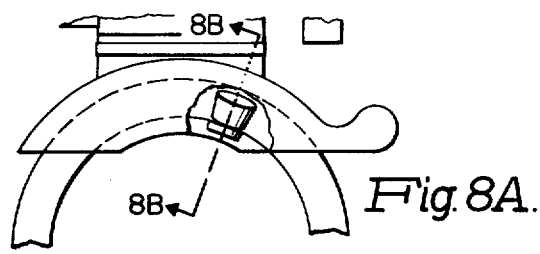
FIG. 8A is a schematic view of a blade housing with a portion cut away to show the combination of a upper blade guide roller and a lower blade support roller.
Figure 8D:
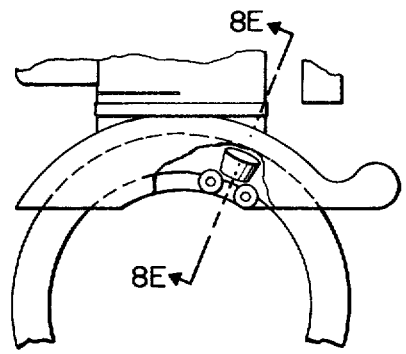
FIG. 8D is a schematic view of a blade housing with a portion cut away to show the combination of an upper blade guide roller and a pair of double flanged blade support rollers.
Figure 8B:
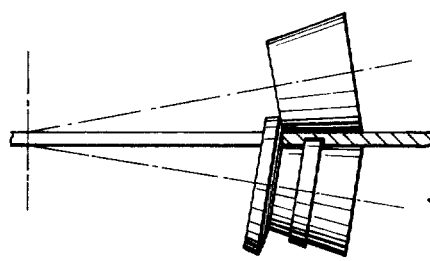
FIG. 8B is a view in section taken along line 8B—8B of FIG. 8A.
Figure 8C:
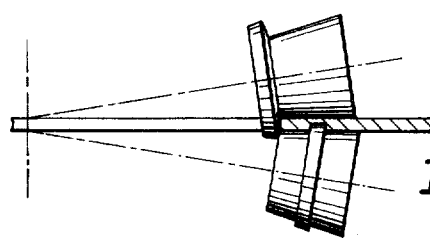
FIG. 8C is a view similar to FIG. 8B except that the upper roller has the supporting end flange instead of the lower roller.
Figure 8E:
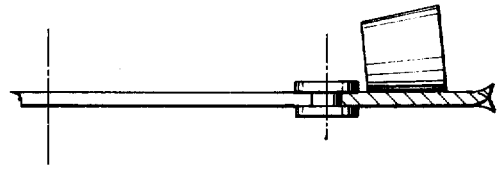
FIG. 8E is a view in section taken along line 8E—8E of FIG. 8D.
Figure 8F:
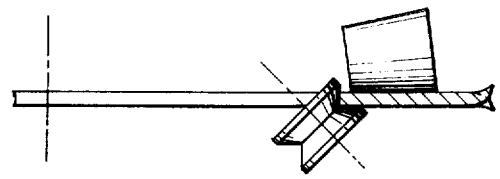
FIg. 8F is a view similar to FIG. 8E except that a beveled blade support roller is substituted for the double flanged rollers.
Figure 8G:
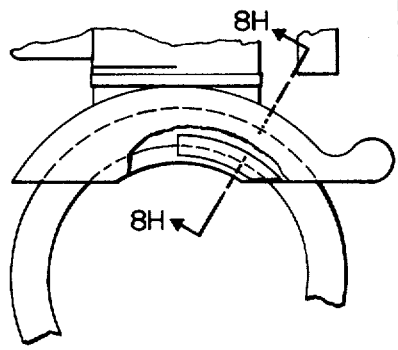
FIG. 8G is a schematic view of a blade housing with a portion cut away to show a stationary self-lubricated bearing block which acts as a blade support.
Figure 8I:
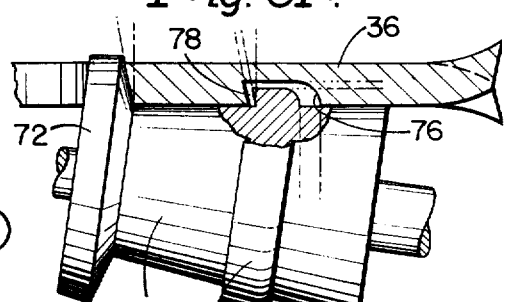
FIG. 8I is a side elevational view similar to FIG. 8B with the roller-groove relationship enlarged for purposes of clarity.

The blade support rollers support the blade against radial displacement, primarily against radial displacement toward the blade center which is the major reaction to the cutting load. The blade support rollers roll on the inner periphery or rim 48 of the blade. In FIGS. 1 and 2, blade support roller 70 is coupled with upper blade guide roller 64 as can best be seen in FIG. 4. Blade support roller 70 has an end flange 72 which bears against blade rim 48 to oppose centrally directed forces. Roller 72 also has projecting ridge 74 which turns within groove 68. It will be seen in FIG. 8I that the purpose of ridge 74 is to oppose extraordinary forces directed radially away from the blade center. It will be seen that when the blade moves centrally, end flange 72 bears against rim 48 while clearance remains between ridge 74 and the outer groove wall 76 to prevent groove wear and heat. On the other hand, when the blade moves radially outward, the ridge 74 bears against the groove inner wall 78. Both the inner groove wall 78 and the ridge portion against which it bears are beveled as shown in FIG. 8I to also produce an axial restraint component downward. Furthermore, blade rim 48 and the end flange portion against which it bears are beveled as shown in FIG. 8I to reduce friction and resultant heat.

Figure 8H:
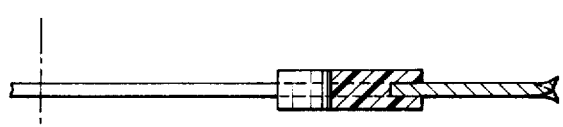
FIG. 8H is a view in section taken along line 8H—8H of FIG. 8G.

FIGS. 8B, 8C, 8E, and 8F show other alternative embodiments of blade support rollers and FIG. 8H shows a stationary self-lubricated bearing having overlying flange elements to restrain axial blade displacement as well as centrally directed radial displacement.

Figure 9:
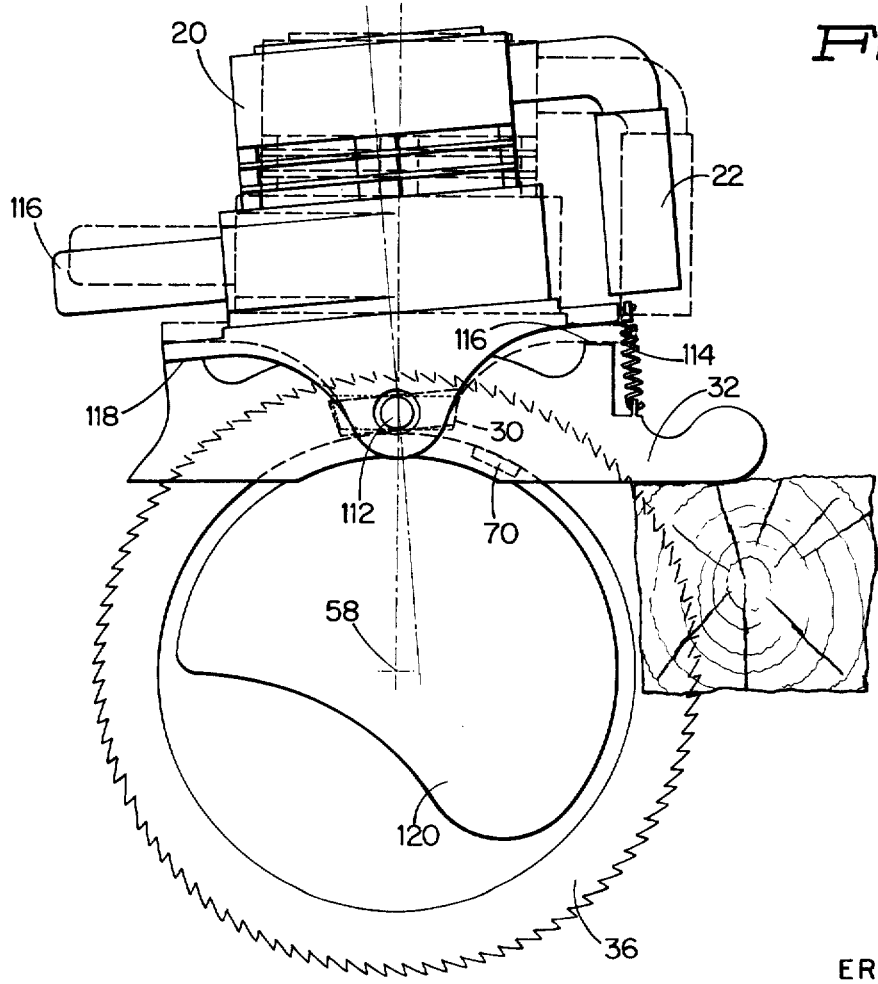
FIG. 9 is a top plan view of a modified embodiment of the power saw wherein the blade housing is mounted on the power unit by means of a pair of aligned pivots which are substantially perpendicular to the plane of the blade, said pivots permitting the drive shaft axis to vary with respect to the position of drive shaft axis intersection of the blade's virtual axis. The power saw is shown in its maximum variance position which it would assume under heavy load, and (in phantom) in its minimum variance position which it would assume under very light or no load.

It is important to note that, as shown in FIGS. 2, 5, and 9 and others, a blade support means 70 is provided on blade rim 48 at some point between the drive roller-blade interface and the straight edge portion 38 of the blade housing 21. In other words, this invention requires a blade support means to act upon the inner blade rim 48 on the cutting side of the blade relative to the drive roller 30. This blade support roller 70 and specifically its end flange 72 acts as a fulcrum about which the workpiece resistance forces act and the drive roller radial forces counteract as will be explained more fully subsequently. It should be understood that only one blade support means is needed to satisfactorily operate the power saw of this invention.

Referring now to FIG. 5, the theory of this invention shall now be explained. This theory has been proven by extensive testing. Drive roller 30 engages the upper surface of blade 36 testing. Drive roller 30 engages the upper surface of blade 36 and produces a tangential driving force $P_1$. This force is transmitted to workpiece 80 by each blade tooth which cuts the wood. Therefore, in accordance with Newton's third law, the workpiece produces resistance or reaction vector forces on each tooth represented by the equation $R_1^{(1)} + R_1^{(2)} \ldots + R_1^{(n)} = R_1$. Theoretically, $P_1 = R_1$ and both forces are tangential. In practice, though, $P_1$ varies from $R_1$, because of friction and other losses.

Also, the operator exerts a force $P_3$ against the workpiece which is resisted by reaction vector $R_2$. The vectorial sum of the reaction vector forces is $R_1 + R_2 = R_T$. It will be seen that $R_T$ produces torque about blade support means 70 which acts as a fulcrum point. The moment of this torque urges blade 36 to rotate about fulcrum point 70 so that the blade's virtual axis 58 tends to rotate toward offset virtual axis 82 which is a point on a circle the center of which is fulcrum 70.

The counterbalancing torque for the torque produced by $R_T$ about the pivot 70 is produced by the force exerted by the drive roller on the saw blade.

For example, if the drive roller axis is directed radially toward the center of the ring blade, and the drive roller pressure against the saw blade is constant, the drive roller, generates only a tangential force $P_1$ to rotate the blade. While the force $P_1$ produces a torque around the pivot 70, tending to balance the torque produced by $R_T$, it is not capable of providing a complete balance for the following reasons.

Assuming, for the sake of this discussion, that friction and other losses are ignored, then $P_1 = R_1$, and $P_1$ is therefore less than $R_T$.

The pivot 70 is generally closer to the drive roller than to the center of the workpiece (see FIG. 5) so that the moment arm of $P_1$ about the pivot 70 is smaller than that of $R_T$.

As mentioned previously the saw blade tends to rotate around the pivot 70. The saw blade is stopped from rotating primarily by the action of the ridge 74 against the groove 78 (as in FIG. 8I). Under these conditions the life of the saw blade is short. In practice, the groove 78, and/or the ridge 74 are worn out as a effective restrainting in a short period of time. The alternative to blancing the torque produced by the workpiece restraining force is a thicker, heavier saw blade both factors contributing to poorer performance and added expence.

To provide a torque balance (i) the force generated by the drive roller may be increased, (ii) the moment arm of the drive roller may be increased, (iii) both the force and the moment arm may be increased, (iv) by generating a radial force toward the center of the saw blade that is independant of drive roller pressure, and (v) by angling the drive axis beyond the center of the saw blade, see the axis 59 in 10B.

MEANS FOR INCREASING THE DRIVE ROLLER FORCE AND MOMENT ARM

If the axis of the drive roller is fixed so that it intersects the blade's plane in what is described as the infinate working quadrant shown as Q is FIGS. 1 and 2, $P_1$ becomes one vector component of the force $P_T$ produced by the drive roller. Additionally, note that the moment arm of $P_T$ is longer than the moment arm of $P_1$.

This quadrant Q is the domain contained between lines X and Y which have their mutual starting points at the midpoint M of the drive roller - ring blade interface. Line X has infinate length toward the cutting side of the blade and line Y has infinite length toward the center of the blade. It is most important to be clear that the domain does not include the center point 60 of the ringblade, the radios R of the mid-point and the point at infinity of line Y. It will also be understood that parallel lines intersect at infinity.

Accordingly, referring again to FIG. 5, if the drive shaft axis is so angled, a force component $P_2$ will be generated radially to supplement force $P_1$ about fulcrum 70. The vectorial sum of the power drive forces is $P_1 + P_2 = P_T$. Additionally, note that the moment arm of $P_T$ is longer than the moment arm of $P_1$.

If $R_T$ were, a perfect balance can be obtained by a judicious selection of the angle between the drive roller axis and the radius of the saw blade. Since $R_T$ is not constant the angle is adjusted so that a perfect balance may be created for the average magnitude of $R_T$.

Experimentally, this blalance is achieved with a 2°–5° contation angle if the pivot 70 is angularly displaced approximately 40° from the mid-point of the drive roller.

Another important feature of the invention is to provide a means for automatically varying the force $P_T$ as $R_T$ varies, through variations in $P_2$, in three ways singly or in combination. Recalling that $P_1$ is essentially equal to $R_1$ and assumed approximately a constant, the magnitude of $P_2$ may be varied dynamically by changing the angle so the drive roller axis (See the vector relationship in FIG. 5) or by adjusting the pressure of the drive roller on the saw blade, or by causing the drive roller to move radially in response to changes in the workpiece resistance forces.

AUTOMATIC DYNAMIC VARIATION IN DRIVE SHAFT AXIS

Referring now to FIG. 9, an embodiment of the invention provides pivot means which semi-automatically varies the drive shaft axis angular displacement relative to the position of the drive shaft axis intersection of the ring tool virtual axis. The automatic operation is operator-aided. This embodiment employs a pair of aligned pivot pins 112 which permits blade housing 32 to pivot relative to power unit 20 so that drive shaft 28 which carries roller 30 pivots on blade 36. A spring 114 exerts a pre-load to urge the power unit 20 against minimum variance limit 116 which is a shoulder formed on blade housing 32. A similar maximum variance limit 118 is a shoulder formed on the other side of the blade housing. Clearly, the maximum and minimum variance limits maybe on the same side of the housing.

Pivot pins 112 are disposed substantially parallel to the virtual axis 58 and preferably are aligned with the drive roller mid-point as shown in FIG. 9. Of course, one larger pivot pin could be employed, but two aligned pins have proven preferable in practice. A large fixed spacer plate 120 is shown in this embodiment.

The purpose of the limits is to ensure that under all blade loadings the drive shaft axis is angled into quadrant Q. As the workpiece is cut, the blade loading increases and it will be seen that the blade housing is urged in a clockwise direction about pivot pins 112. Then, as cutting proceeds and the blade loading varies, the drive shaft axis angle varies to balance the torque forces about fulcrum 70.

AUTOMATIC DYNAMIC VARIATION IN DRIVE ROLLER PRESSURE

Figure 10A:
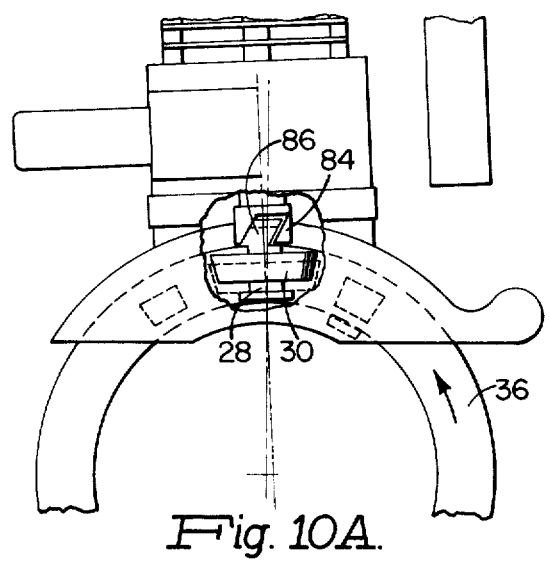
FIg. 10A is a simplified top plan view of the power saw of FIG. 2 with a portion of the blade housing cut away to show the cam means for advancing the drive roller toward the blade interior. The no load position is shown and the heavy load position is shown in phantom.
Figure 10B:
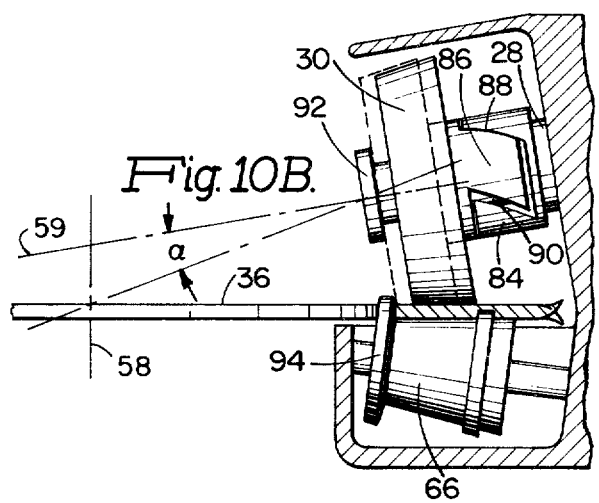
FIG. 10B is a view in section taken along the drive shaft axis of FIG. 10A.

Referring now to FIGS. 10A and 10B, one embodiment of this invention provides a cam means incorporated in the drive shaft-drive roller assembly. A cam 84 is fixed to the drive shaft 28 and a cam follower 86 is fixed to the drive roller 30. As the drive shaft rotates under blade load, its trailing shoulder 88 bears against follower 86 and cams the drive roller radially toward the blade center and into increased pressure engagement with the blade 36. When blade loading is decreased, the blade tends to increase its speed and cam follower 86 revolves relative to cam 84 whereby its leading shoulder 90 bears against follower 86 and cams drive roller radially away from the blade center decreasing the pressure engagement with the blade 36.

It will be seen that shaft 28 has a safety flange 92 limiting the pressure applied by drive roller 30. Also blade guide roller 66 has a rim flange 94 which limits an excess of blade movement radially toward the blade center. Of course, this blade movement is primarily opposed by the resistance torque.

Independent of the variation in drive roller pressure caused by the axial movement of the drive roller on its drive axis, this axial movement, per se, creates an axially directed frictional force on the saw blade. Obviously if the drive axis intercepts the virtual axis of the saw blade, the frictional force is an added radial force.

The FIGS. 10A and 10B embodiment illustrates the feature whereby the drive axis is angled beyond the center of the saw blade. See axis 59. The aforementioned frictional force per unit axial movement of the drive roller increases as the angle $\alpha$ increases.

The foregoing discussion with respect to FIGS. 10A and 10B illustrate the important consideration, namely that (i) the cantation of the drive shaft angle (ii) the increase in drive roller pressure, (iii) the frictional force produced by the axial movement of the drive roller and (iv) the angling of the drive axis beyond the center of saw blade, may be used singly or in combination.

Figure 11A:
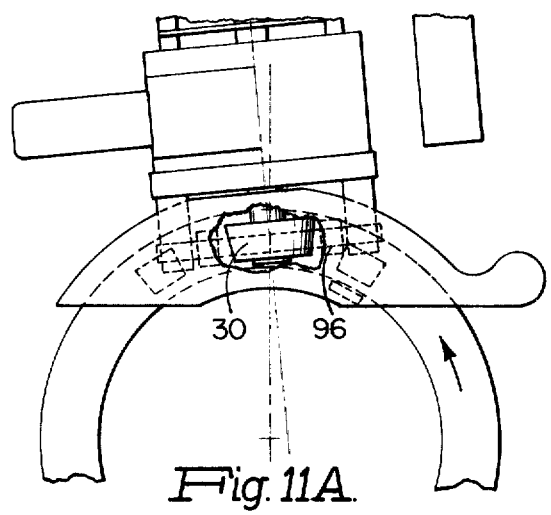
FIG. 11A is a simplified top plan view of another embodiment of the power saw wherein the blade housing is pivoted to the power unit by a pivot pin located below the blade, substantially parallel to the plane of the blade and substantially perpendicular to the drive shaft axis.
Figure 11B:
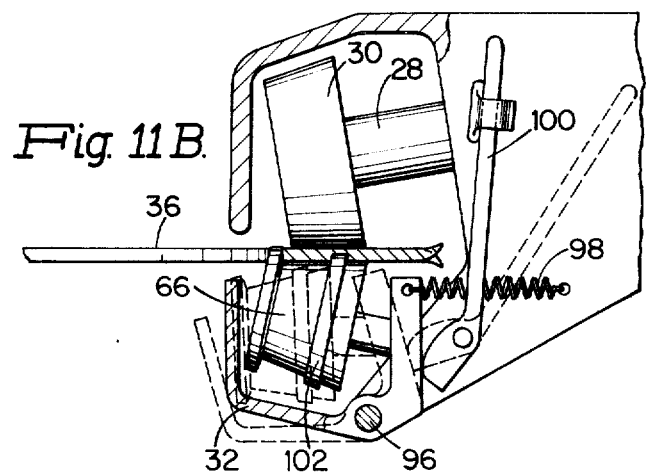
FIG. 11B is a view in section taken along the drive shaft axis of FIG. 11A. The blade removal position is shown in phantom.

Referring now to FIGS. 11A and 11B, another embodiment of the invention provides pivot means which automatically varies the pressure the drive roller applies to the ring blade. This embodiment employs a pivot pin 96 which permits blade housing 32 to carry blade guide roller 66 upwardly to raise blade 36 into firmer engagement with drive roller 30. A spring 98 exerts a pre-load on pivoted blade housing 32 to ensure a minimum pressure between the drive roller and the blade. A pivoted handle 100 is provided to permit quick blade insertion and withdrawal.

Pivot pin 96 is disposed substantially parallel to the blade plane and substantially perpendicular to the drive shaft axis.

The pivot pin 96 is spaced further from the center of the saw blade than is the mid-point of the drive roller-saw blade interface P.

It will be seen that as resistance torque increases, blade 36 will tend to move radially away from the blade center at the drive roller-blade interface. Thus, as FIG. 11B clearly shows both the frictional engagement between roller 66 and the blade underside as well as the ridge 102 engagement in blade groove 68 force the blade housing 32 to rotate clockwise and force the blade into greater pressure engagement with the drive roller 30 in direct relation to this radial blade movement in a completely automatic operation.

It will be understood that pivot point can alternately be disposed on the same side of the drive roller or in line with the plane of the saw blade, to increase or decrease the drive roller pressure automatically.

This FIGS. 11A and 11B concept may be used in combination with the other described means for varying torque.

Figure 12A:
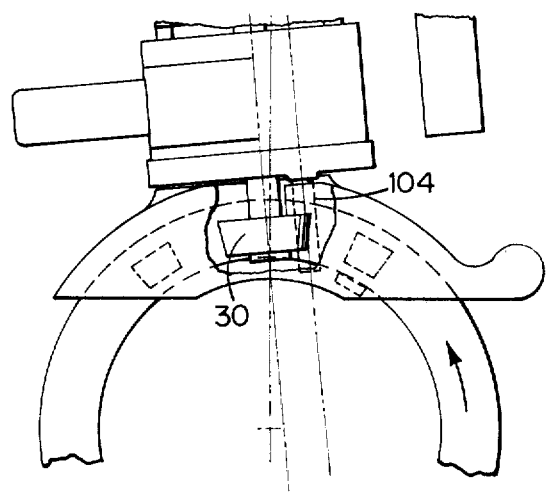
FIG. 12A is a simplified top plan view of yet another embodiment of the power saw wherein the blade housing is pivoted to the power unit by a pivot pin located below the blade. The pivot pin is substantially parallel to the plane of the blade and to the drive shaft axis.
Figure 12B:
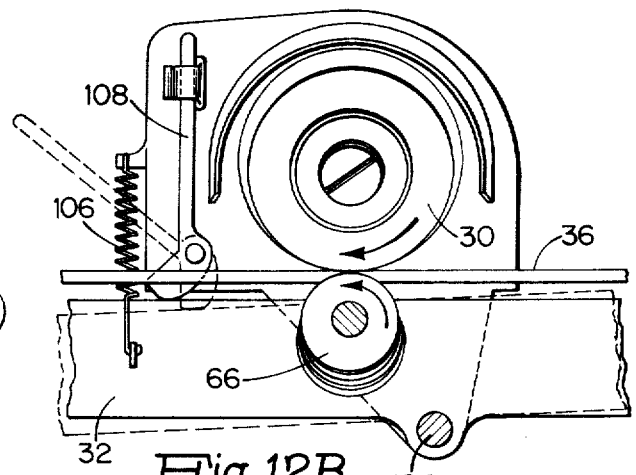
FIG. 12B is a front elevational view of the power saw shown in FIG. 12A as viewed from the blade center. The blade removal position is shown in phantom.

Referring now to FIGS. 12A and 12B, another embodiment of the invention provides pivot means which automatically varies the pressure the drive roller applies to the ring blade. This embodiment employs a pivot pin 104 which permits blade housing 32 to carry blade guide roller 66 upwardly to raise or lower the blade 36 into firmer or looser engagement with drive roller 30. A spring 106 exerts a pre-load on pivoted blade housing 32 to ensure a minimum pressure between the drive roller and the blade. A pivoted handle 108 is provided to permit quick blade insertion and withdrawal.

Pivot pin 104 is disposed substantially parallel to the blade plane and substantially parallel to the drive shaft axis. It will be seen that as the blade loading is increased by workpiece resistance, the frictional force created by the engagement between roller 66 and the lower side of blade 36 rotates roller 66 upwardly about pivot pin 104 to press the blade tightly against drive roller 30. This is a completely automatic operation and occurs for all blade loadings except when the blade fully stops and the driving wheel slips Upon such blade stoppage, the frictional engagement ceases leaving only the pre-load pressure of spring 106.

Analagous to the FIGS. 11A and 11B embodiment, a pivot may be associated with the drive roller to utilize the frictional force derived from the intersection of the drive roller on the upper side of the saw blade.

It will be seen in FIG. 12B that pivot pin 104 must be located on the side of the blade opposite to that of the drive roller and toward the cutting side of the blade. That is, an upward projection of the pivot pin 104 on the ring blade when viewed in plan from above (as shown in FIG. 12A) shows the pin to be between the drive roller-ring tool interface and the cutting side of the blade.

Also as in the power saws of FIGS. 10A and 11A, the drive shaft axis is angled into quadrant Q.

QUICK BLADE RELEASE MEANS

Figure 15A:
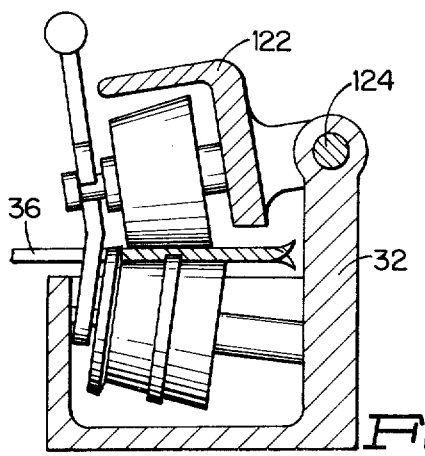
FIGS. 15A, 15B, and 15C are side elevational views of three alternative embodiments of the blade support roller combination unit shown in FIG. 4. These views show pivoted, spring-loaded and screw threaded means for retracting the upper blade guide roller to permit blade changing.
Figure 15B:
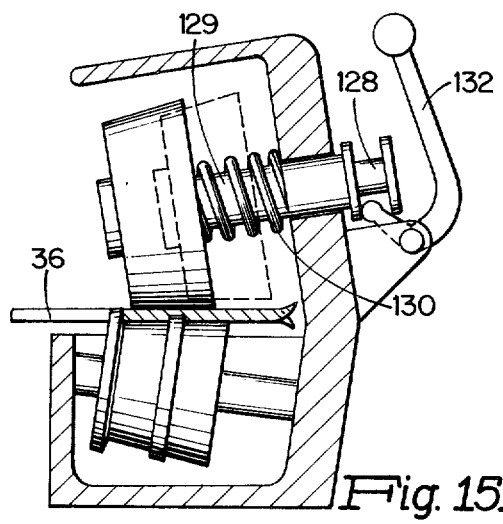
Figure 15C:
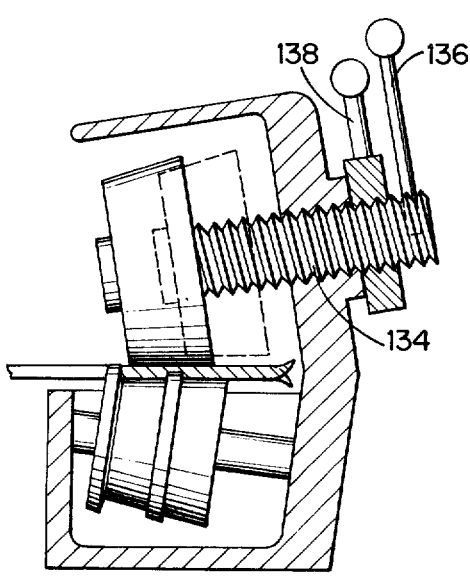

Referring now to FIGS. 15A, 15B, and 15C, various means for removing the upper roller of a roller pair are shown to facilitate fast blade insertion and withdrawal. Specifically, FIG. 15A shows a portion 122 pivoted to blade housing 32 by pivot pin 124. Actuation of locking handle 126 permits portion 122 to be pivoted clear of blade 36.

FIG. 15B shows a flanged cap 128 mounted on the end of roller shaft 129 which is sping-loaded by spring 130. Actuation of pivoted handle 132 retracts shaft 129 and the upper roller to permit blade insertion and withdrawal.

FIG. 15C is very similar to the removal device of FIG. 15B except that a threaded shaft 134 is revolved by handle 136 and another handle 138 preforms a locking function.

Figure 13:
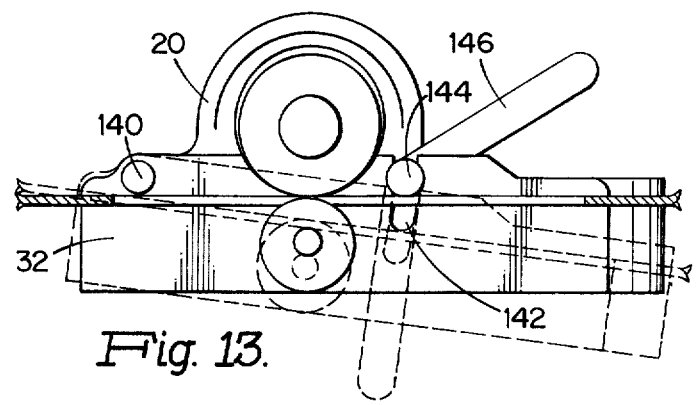
FIG. 13 is a simplified from elevational view of the power saw of FIGS. 1 and 2 as viewed from the blade center showing means for mounting the blade housing on the power unit. The dismounting position is shown in phantom.

FIG. 13 shows one embodiment wherein blade housing 32 is mounted on power unit 20 by means of a pivot pin 140 fixed in the power unit. The housing is pushed onto pin 140 and is swung upwardly whereby its slot 142 engages headed shaft 144 which is then locked to the slot by handle 146. This is an extremely quick-acting disassembly means by which the entire housing and ring blade are removed in one motion from the power unit. A spring may operate in association with handle 146 or substituted for handle 146 to preload the drive roller.

Figure 14:
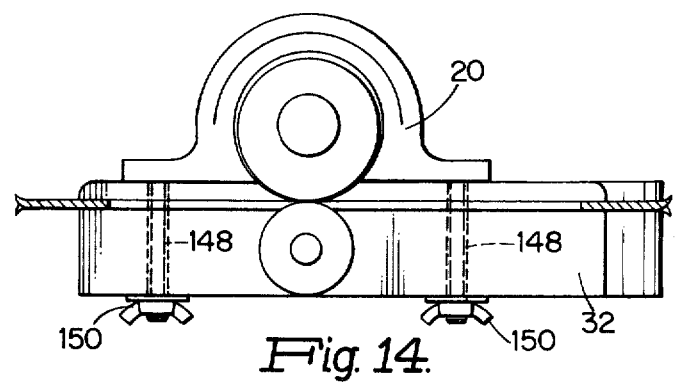
FIG. 14 is a simplified front elevational view as viewed from the blade center of another embodiment of the means for mounting the blade housing on the power unit.

FIG. 14 shows another embodiment wherein blade housing 32 is mounted on power unit 20. As can be clearly seen, the housing is slid onto one or more shafts 148 which are fixed in the power unit and the assembly is secured together by wing nuts 150. A spring interconnecting handle 132 to the housing will preload the drive roller.

WIPER BLADES AND LUBRICATION

Figure 16:
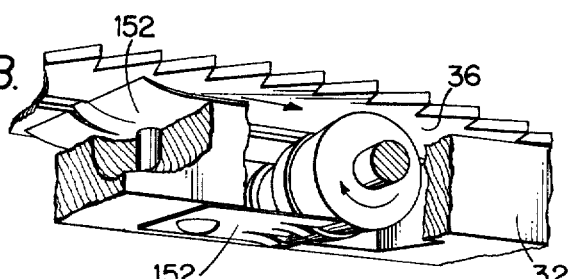
FIG. 16 is a perspective view of the wiping blade mounted on the blade housing which clears waste from the rollers and the blade.

FIG. 16 shows the wiper blades 152 which are employed to prevent cutting waste form building up on the rollers and on the saw blade.

Figure 17:
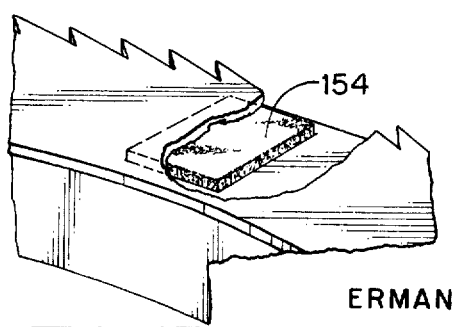
FIG. 17 is a perspective view of the lubricating pad which contacts the upper and/or lower surfaces of the ring blade.

FIG. 17 shows the self-lubricated pads 154 which lubricate all moving components of the power saw.

The invention has been illustrated through the use of a single drive motor. This is not a limitation In providing a stationary, "bench," tool added power may be provided to the ring tool by a second motor and drive roller located, for example on the same side or beneath the ring tool.

The above description obviously suggests many possible variations and modifications of this invention which would not depart from its spirit and scope. It should be understood, therefore, that the invention is not limited in its application to the details of structure specifically described or illustrated and that within the scope of the appended claims, it may be practiced otherwise than as specifically described or illustrated.

I claim:

1. In a manual annular ring tool power saw having a housing for supporting the annular ring tool and a power unit mounted on the housing, an improved ring tool stablization means comprising:
   a two-piece ring tool housing interconnected by a pivot means for permitting the two pieces of said housing to pivot toward and away from each other and preload means for urging said two pieces toward each other;
   an annular ring tool detachably retained in said housing;
   a power unit mounted on one piece of said housing, said power unit having a drive shaft terminated in a drive roller thereon adapted to engage one side of the ring tool to rotate the ring tool about its virtual axis, said drive roller being located relative to said pivot such that workpiece resistance forces produce a torque about said pivot for moving said housing pieces toward each other; and
   a ring tool support means mounted on said other housing piece adapted to engage the opposite side of the ring tool, said support means in combination with the drive roller forming the driving pressure applied by the drive roller to the ring tool, said support means being responsive to increases and decreases in workpiece resistance forces for causing said housing pieces to pivot toward and away from each other for increasing and decreasing the driving pressure of the drive roller on the ring tool.

2. The power tool of claim 1 wherein said pivot means is substantially parallel to the ring tool plane and substantially perpendicular to the drive shaft axis.

3. The power tool of claim 2 wherein said pivot means is disposed on the side of the ring tool opposite that of the drive roller and is disposed a greater radial distance than is the drive roller-ring tool interface mid-point.

4. The power tool of claim 2 wherein said pivot means is disposed on the same side of the ring tool as the drive roller and is disposed a greater radial distance than is the drive roller-ring tool interface mid-point.

5. The power tool of claim 2 further including pre-load means for applying minimum pressure between the drive roller and the ring tool.

6. The power tool of claim 1 wherein said pivot means is substantially parallel to the ring tool plane and substantially parallel to the drive shaft axis.

7. The power tool of claim 6 wherein said pivot means is disposed on the side of the ring tool opposite that of the drive roller and the projection of said pivot means on the ring tool plane is disposed between the drive roller-ring tool interface and the non-working side of the ring tool.

8. The power tool of claim 6 further including pre-load spring means for applying minimum pressure between the drive roller and the ring tool.

9. The power tool of claim 1 which includes in addition said drive shaft extending at an angle to the plane of the ring tool such that the drive shaft axis intersects an infinite working quadrant of the ring tool plane, said infinite working quadrant being defined as the domain contained between two lines having their mutual starting points at the mid-point of the drive roller-ring tool interface, one line extending perpendicular to the radius of said mid-point of the ring tool and having infinite length toward the working side of the ring tool, the other line extending along the radius of said mid-point of the ring tool and having infinite length toward the center of the ring tool.

10. The power tool of claim 1 wherein the said power ring drive shaft has cam means incorporated therein to automatically extend and retract the drive roller on the drive shaft thereby varying the pressure the drive roller applies to the ring tool in relation to the load applied to the ring tool.

11. The power tool of claim 1 wherein the housing is mounted on the power unit by pivot means which is disposed substantially perpendicular to the ring tool plane, said pivot means permitting angular displacement of the drive shaft axis relative to the position of drive shaft axis intersection of the ring tool virtual axis within limits when viewed in plan from above in direct relationship to the resultant reaction force applied to the ring tool at the workpiece interface during power tool operation.

12. The power tool of claim 11 wherein said limits are opposing pairs of shoulders provided on said power unit and said ring tool housing, one pair establishing minimum drive shaft axis angular displacement and the other pair establishing maximum drive shaft axis angular displacement.

* * * * *